No. 855,555. PATENTED JUNE 4, 1907.
J. W. AYLSWORTH.
PROCESS OF MAKING DUPLICATE SOUND RECORDS.
APPLICATION FILED MAY 31, 1906. RENEWED APR. 4, 1907.
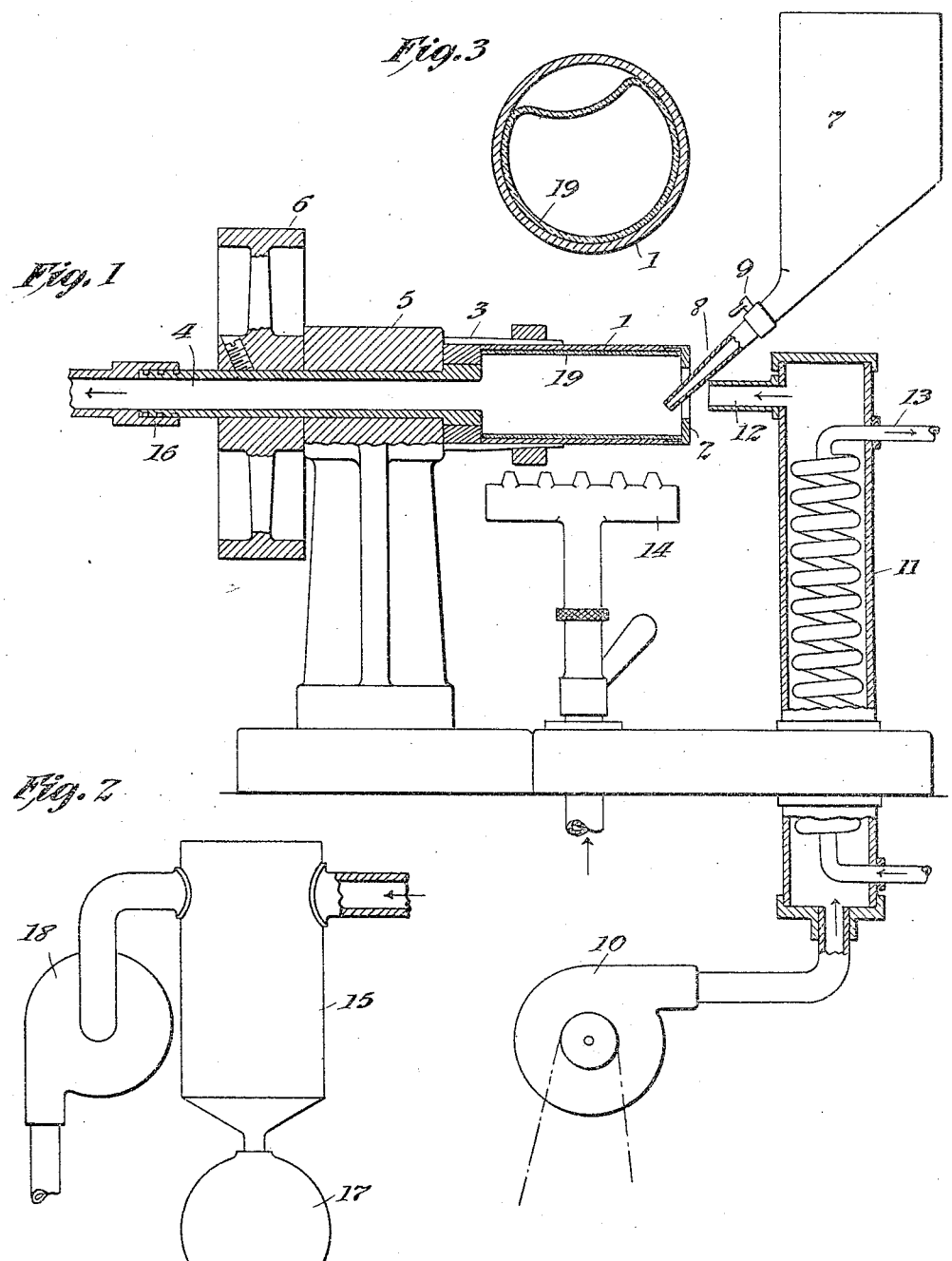

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

PROCESS OF MAKING DUPLICATE SOUND-RECORDS.

No. 855,555.      Specification of Letters Patent.      Patented June 4, 1907.

Application filed May 31, 1906. Renewed April 4, 1907. Serial No. 366,430.

*To all whom it may concern:*

Be it known that I, JONAS W. AYLSWORTH, a citizen of the United States, residing at 223 Midland avenue, East Orange, county of Essex, and State of New Jersey, have invented a certain new and useful Process for Making Duplicate Sound-Records, of which the following is a description.

My invention relates to an improved process for making duplicate sound records of celluloid, pyroxylin, collodion, cellulose, and other suitable materials not capable of being rendered molten so as to be cast, but dissolving readily in solvents, and in that condition being readily manipulated. I am, of course, aware that duplicate sound records have been made of celluloid and similar materials by the application of heat and pressure, but with such process it has been found impossible to obtain a smooth surface, so that the records are rough and scratchy. Furthermore, the material in being pressed into engagement with the record surface becomes merely distorted so as to conform with more or less exactitude with the irregularities thereof, and there is therefore always a tendency for the material to revert to its original condition, thereby resulting in a gradual weakening of the record surface. It has also been proposed to make records of pyroxylin or similar materials by dipping a mold or matrix in a solution of the material to form a film from which the solvent is allowed to evaporate, but such a film is manifestly excessively thin, and hence difficult to handle and to properly support. Obviously, if it were attempted to build up a record of greater thickness by repeating the dipping operations, the outer films would be likely to peel off, while during manufacture the film or films already deposited within the matrix would be dissolved more or less by the solvent so that the operation would be necessarily slow and expensive.

My invention relates to an improved method by which records can be made of the materials under consideration in a very cheap and effective manner by an operation strictly analogous to a true casting process, so that there will be no tendency of the record surface to become changed in use, while at the same time the record surface will be smooth and brilliant, and furthermore, the record will be perfectly homogeneous throughout and of any desired thickness.

The process consists in rotating a matrix or mold at a high speed, and in introducing within the same a solution of the desired solid material, such as celluloid or pyroxylin, or compounds employing the same, whereby the centrifugal force developed will cause the solution to distribute itself uniformly over the bore of the matrix, thereby driving any air bubbles inward and causing the solution to intimately engage the record surface, so as to fill all the irregularities of its contour. After the solution has been thus distributed over the bore of the matrix so as to take an accurate impression from the record surface thereof, the solvent is either permitted to evaporate or is forcibly evaporated so as to deposit the solid material as a homogeneous cylindrical body with an absolutely accurate impression of the record surface molded on its exterior. Preferably, the evaporation of the solvent is facilitated by a blast of hot air, from which the solvent can be evaporated by condensation so as to permit the process to be carried on economically. After the record has been formed within the matrix, it is separated therefrom, preferably by immersing the matrix with its contents in hot water so as to permit the duplicate to be readily stripped out by collapsing it inward or by subjecting the matrix to sufficient cold to cause the duplicate to shrink diametrically, so as to clear the matrix, as I will more fully hereinafter describe and claim.

In order that the invention may be better understood, attention is directed to the accompanying drawing, forming part of this specification, and in which—

Figure 1, is a diagrammatic view of a portion of a suitable apparatus for carrying the process into effect, Fig. 2, a similar view, showing the condenser and suction fan, and Fig. 3, a cross sectional view through the matrix, illustrating one way of removing the finished record.

In all of the above views, corresponding parts are represented by the same numerals of reference.

The matrix 1 is formed in any suitable way from a master record, but preferably, by a process of vacuous deposit, as is well-known in the art. This matrix is provided with an end flange 2, which may be integral or removable, as desired, and which may carry suitably engraved matter for identifying the record, as heretofore. Suitable provision is made for rotating the matrix at the necessary speed, as for instance, a chuck 3 carried by a hollow shaft 4, the latter being mounted in a suitable bore 5, and rotated by a pulley 6. The chuck 3 as is shown, forms a closure for the matrix at its inner end.

In order to introduce the solution within the matrix, I show a tank 7 from which leads a nozzle 8 into the matrix and provided with a valve 9 for controlling the flow of liquid. Preferably provision is made for rapidly evaporating the solvent, after the solution has been uniformly distributed over the bore of the mold and time has been allowed for the dispersion of all air bubbles. For this purpose I illustrate a fan or blower 10, connected with a chamber 11, having an outlet 12, leading to the matrix and heated in any suitable way, as for example, by a steam coil 13, whereby the air before reaching the matrix will be heated so as to drive off the solvent more rapidly. For the same purpose, nozzles provided with a series of vents may be arranged adjacent to the rotating matrix and connected with a suitable supply of warm or hot air, so as to heat the matrix and facilitate the driving off of the solvent. When it is desired to recover the solvent during the process, I employ a condenser 15 connected with the hollow shaft 4 by a suitably packed joint 16 and provided with a receiving tank 17, beneath the condenser in which the solvent separated by the same will be recovered, as is common in the art of distillation. If desired, a suction fan 18 may be connected to the condenser so as to facilitate the circulation of hot air and the volatile solvent carried therewith, but this suction fan may be dispensed with, if a sufficient blast is provided by the blower 10.

In carrying my process into effect, I first charge the tank 7 with a solution of the desired material, as for example a solution of pyroxylin in acetone, although any other suitable material may be employed with the proper solvent for the same, or the solid material may be more or less adulterated with various cheaper substances, such as castor oil or camphor, or a number of solid materials may be employed together so long as a solution of the same can be secured. The solution need not be very limpid, but at the same time care should be taken not to have it too viscid, so as to flow with difficulty and fail to take a clear and sharp impression of the record surface. A solution having about the consistency of molasses will be amply limpid for the purpose. The tank 7 being thus charged with a suitable solution, the matrix is rotated at the desired speed and the valve 9 is opened, permitting a sufficient charge of the solution to enter the matrix. Owing to its liquid form, the solution will be distributed by the centrifugal force uniformly over the entire bore of the mold, so as to intimately engage and take a sharp impression of the record surface. At the same time, any air bubbles which may become entrapped by the solution will be driven radially inward, so that the record surface will be free from any roughness, and will be an absolutely accurate copy of the matrix. When the solution is introduced within the matrix, the latter is preferably maintained at or below the room temperature, so as to permit the solution to become uniformly distributed, as explained, without an appreciable evaporation of the solvent taking place. After the material has been thus distributed over the bore of the matrix, which of course, will require only a few seconds, a warm blast from the fan or blower 10 is driven through the matrix and the latter is also preferably heated by the blast 14. This results in the rapid evaporation of the solvent, which will be carried off with the hot air and separated from the latter in the condenser 15. The separated solvent collected in the tank 17, may be used again in the make-up of fresh solutions. When the solvent has been entirely evaporated, the record 19 will exist as a tubular structure, intimately engaging the matrix and following with absolute accuracy all the contours and variations of the record surface. The thickness of the walls of the record will obviously depend upon the amount of the solution introduced within the matrix.

When the record is provided with thin enough walls to be collapsed, the matrix may be first dipped in hot water so as to slightly soften the record and permit it to be collapsed inwardly, as shown in Fig. 3, so as to be thereby separated from the matrix. If, however, it is formed with relatively thick walls, so as not to be capable of being collapsed readily, the matrix may be subjected to cold, or be allowed to chill so as to cause the record to shrink radially away from the matrix and permit of its removal. Records made in this way can be provided with separate end flanges to permit them to be mounted on the tapered mandrel of the phonograph or they may be mounted on false shells, which in turn are carried on the mandrel, both of which expedients are well known in the art. If, however, the phonograph is provided with an expansible mandrel, the record may be used directly thereon, since it will be formed with a cylindrical bore, as an inherent result of the process.

Having now described my invention, what I claim as new and desire to secure by Letters Patent is as follows:

1. The process of making duplicate phonograph records, which consists in rapidly rotating a matrix, in introducing therein a solution of a solid material, whereby the solution will distribute itself uniformly over the bore of the matrix and in then driving a blast of air through the matrix as it continues to rotate in order to evaporate the solvent from the solid material, substantially as set forth.

2. The process of making duplicate phonograph records, which consists in rapidly rotating a matrix, in introducing therein a solution of a solid material, whereby the solution will distribute itself uniformly over the bore of the matrix and in then driving a blast of warm air through the matrix as it continues to rotate in order to evaporate the solvent from the solid material, substantially as set forth.

3. The process of making duplicate phonograph records, which consists in rapidly rotating a matrix, in introducing therein a solution of a solid material, whereby the solution will distribute itself uniformly over the bore of the matrix, in then driving a blast of air through the matrix as it continues to rotate in order to evaporate the solvent from the solid material, and in finally condensing the evaporated solvent, substantially as set forth.

4. The process of making duplicate phonograph records, which consists in rapidly rotating a matrix, in introducing therein a solution of a solid material, whereby the solution will distribute itself uniformly over the bore of the matrix, in then driving a blast of warm air through the matrix as it continues to rotate in order to evaporate the solvent from the solid material, and in finally condensing the evaporated solvent, substantially as set forth.

5. The process of making duplicate phonograph records, which consists in rapidly rotating the matrix, in introducing therein a solution of the solid material, whereby the latter will be distributed over the bore of the matrix by the centrifugal force developed, and finally in applying heat to the matrix so as to facilitate the evaporation of the solvent, substantially as set forth.

6. The process of making duplicate phonograph records, which consists in rotating the matrix at a high speed, in introducing therein a solution of a solid material, whereby the latter will be distributed over the bore of the matrix by the centrifugal force developed, in then heating the matrix and simultaneously blowing a blast of air through the same so as to evaporate and carry off the solvent, substantially as set forth.

7. The process of making duplicate phonograph records, which consists in rotating the matrix at a high speed, in introducing therein a solution of a solid material, whereby the latter will be distributed over the bore of the matrix by the centrifugal force developed, in then heating the matrix and simultaneously blowing a blast of warm air through the same so as to evaporate and carry off the solvent, substantially as set forth.

8. The process of making duplicate phonograph records, which consists in rotating the matrix at a high speed, in introducing therein a solution of a solid material, whereby the latter will be distributed over the bore of the matrix by the centrifugal force developed, in then heating the matrix, in simultaneously blowing a blast of air through the same so as to evaporate and carry off the solvent and in condensing and separating the evaporated solvent, substantially as set forth.

9. The process of making duplicate phonograph records, which consists in rotating the matrix at a high speed, in introducing therein a solution of a solid material, whereby the latter will be distributed over the bore of the matrix by the centrifugal force developed, in then heating the matrix, in simultaneously blowing a blast of warm air through the same so as to evaporate and carry off the solvent, and in condensing and separating the evaporated solvent, substantially as set forth.

This specification signed and witnessed this 29th day of May 1906.

JONAS W. AYLSWORTH.

Witnesses:
FRANK L. DYER,
ANNA R. KLEHM.